(12) United States Patent
Fulcher

(10) Patent No.: US 6,519,891 B2
(45) Date of Patent: Feb. 18, 2003

(54) INFLATABLE DECOY

(76) Inventor: Daniel B. Fulcher, 3231 Big Oak Lake Rd., Spring Hill, TN (US) 37174

( * ) Notice: Subject to any disclaimer, the term of this patent is extended or adjusted under 35 U.S.C. 154(b) by 0 days.

(21) Appl. No.: 09/873,322

(22) Filed: Jun. 5, 2001

(65) Prior Publication Data

US 2002/0178638 A1 Dec. 5, 2002

(51) Int. Cl.[7] ............................................. A01M 31/06
(52) U.S. Cl. ............................................................ 43/2
(58) Field of Search ............................................. 43/2, 3

(56) References Cited

U.S. PATENT DOCUMENTS

| | | | |
|---|---|---|---|
| 547,032 A | * 10/1895 | Ross | 43/2 |
| 1,822,763 A | * 9/1931 | Cook | 43/2 |
| 1,933,844 A | * 11/1933 | Davis | 43/2 |
| 3,704,538 A | 12/1972 | Gagnon | |
| 3,707,798 A | 1/1973 | Tryon | |
| 4,062,141 A | 12/1977 | Shjeflo | |
| 4,339,887 A | * 7/1982 | Streeter | 43/2 |
| 4,611,421 A | 9/1986 | Jacob | |
| 4,753,028 A | 6/1988 | Farmer | |
| 4,773,178 A | * 9/1988 | Marek | 43/2 |
| 4,821,444 A | 4/1989 | Remus | |
| 4,829,698 A | * 5/1989 | Hoecherl | 43/3 |
| 5,003,718 A | 4/1991 | Lenert et al. | |
| 5,172,507 A | 12/1992 | Franceschini | |
| 5,196,242 A | 3/1993 | Vicino | |
| 5,522,168 A | * 6/1996 | Friddle | 43/1 |
| 5,682,701 A | 11/1997 | Gammon | |
| 5,797,208 A | * 8/1998 | Lessa | 43/2 |
| D437,382 S | 2/2001 | Krise et al. | |
| 6,216,382 B1 | * 4/2001 | Lindaman | 43/2 |

* cited by examiner

Primary Examiner—Thomas Price
(74) Attorney, Agent, or Firm—Richard C. Litman

(57) ABSTRACT

An inflatable decoy is disclosed having an outer cover forming a cavity. The outer cover is fabricated from a thin, flexible, material. The exterior of the outer cover is imprinted with an actual life-sized photograph of a game animal. Structure is disposed in the cavity for expanding the decoy to simulate life-size game. The decoy is mounted for wind-aided movement.

7 Claims, 6 Drawing Sheets

INFLATABLE DECOY

BACKGROUND OF THE INVENTION

1. Field of the Invention

The present invention generally relates to hunting accessories. More specifically, the present invention is drawn to an inflatable decoy used to attract game within range of a hunter's firearm or photographer's lens.

2. Description of Related Art

The hunter currently employs a variety of devices to lure game within range of his/her firearm. Such devices include calls, which attempt to imitate the vocal sounds uttered by the intended prey; odor emitting structures, which attempt to emulate the scent of the prey; and decoys, which attempt to simulate the appearance of the prey in its natural habitat. The present invention relates to the latter device.

In the past, some decoys have proven to be unsuccessful because they only depict two dimensional simulation and are thus, not realistic enough to persuade cunning game to approach. Examples of this silhouette type of decoy are shown in U.S. Pat. No. 3,707,798 (Tryon) and U.S. Pat. No. 4,821,444 (Remus).

There are other decoys which rely on the blowing wind to inflate the decoy body and create a three dimensional effect. Such decoys are exemplified in U.S. Pat. No. 4,062,141 (Shjeflo), U.S. Pat. No. 4,611,421 (Jacob), and U.S. Pat. No. 4,753,028 (Farmer). The instant decoys may. be ineffective if there is only minimum or no wind speed.

U.S. Pat. No. 3,704,538 (Gagnon), and U.S. Pat. No. 5,172,507 (Franceschini), disclose inflatable decoys designed to simulate water fowl. The decoys are provided with keels for floatation purposes and would be ineffective for land use. A simulated water fowl decoy is also shown in U.S. Pat. No. 5,003,718 (Lenert). The latter device is merely a hollow shell having an upper portion formed to simulate a duck.

An inflatable decoy designed to simulate a deer is disclosed in U.S. Pat. No. 4,773,178 (Marek). The device requires oral inflation and is firmly anchored to the ground in an upright position. No provision is made to create an appearance of movement.

U.S. Pat. No. 5,682,701 (Gammon) shows an inflatable decoy designed to simulate a human hunter. The instant decoy is fastened to a tree and also lacks means to create an appearance of movement.

U.S. Pat. No. D437,382 S (Krise et al.) shows a design for an inflatable wild turkey decoy. There is no indication as to the structure of the inflation means.

U.S. Pat. No. 5,196,242 (Vicino) shows inflatable structures made of self-inflating foam. The instant patent does not contemplate a decoy having mounting means to simulate movement.

Self-inflating structures, used for informational displays, are disclosed in U.S. Pat. No. 5,196,242 (Vicino).

None of the above inventions and patents, taken either singly or in combination, is seen to disclose a three dimensional, exact photo-copy replica, easily-inflatable decoy which is mounted for movement as will be subsequently described and claimed in the instant invention.

SUMMARY OF THE INVENTION

The present invention comprises an inflatable decoy which, in a first embodiment, comprises a thin, air-impermeable outer covering imprinted with an actual life-sized photograph of the species (turkey, duck, deer, etc.) of game that the hunter intends to lure. The outer covering is configured to assume the shape of the photograph. A resilient, light-weight, open-cell foam material partially fills the outer covering and is heat sealed therein. When ambient air penetrates the cells, the foam completely fills the covering and the decoy assumes a three-dimensional configuration. Removal of air from the open-cell foam material will allow the decoy to be reduced to a fraction of its normal three-dimensional size, thereby facilitating portability and storage. As contemplated, the decoy is loosely mounted on a stake or the like so that even minimum wind currents will cause the decoy to give the appearance of actual game movement.

A second embodiment of the invention comprises a light-weight device adapted to be inserted inside the photocopied, game-depicting outer covering. The device is fabricated from spring wire and a centrally positioned cord. A pinch clasp is positioned for movement on the cord. The device may be expanded or collapsed by merely moving the pinch clasp along the cord. The invention as portrayed in the second embodiment, is also adapted to be loosely mounted on a stake so as to give the appearance of movement.

A third embodiment of the invention employs a shutter mechanism which is positioned inside the game cover as is the second embodiment. The lure may be expanded by opening the shutters or collapsed by closing the shutters. The neck and head in the second and third embodiments will be filled with open celled foam.

Accordingly, it is a principal object of the invention to provide a decoy which portrays an actual life-sized photographic image of the hunted game.

It is another object of the invention to provide a decoy which can be reduced in size to facilitate portability.

It is a further object of the invention to provide a decoy which is easily inflated.

Still another object of the invention is to provide a decoy which can be mounted to give an appearance of natural movement.

It is an object of the invention to provide improved elements and arrangements thereof in a device for the purposes described which are inexpensive, dependable and fully effective in accomplishing their intended purposes.

These and other objects of the present invention will become readily apparent upon further review of the following specification and drawings.

DETAILED DESCRIPTION OF THE PREFERRED EMBODIMENTS

Figure 1:
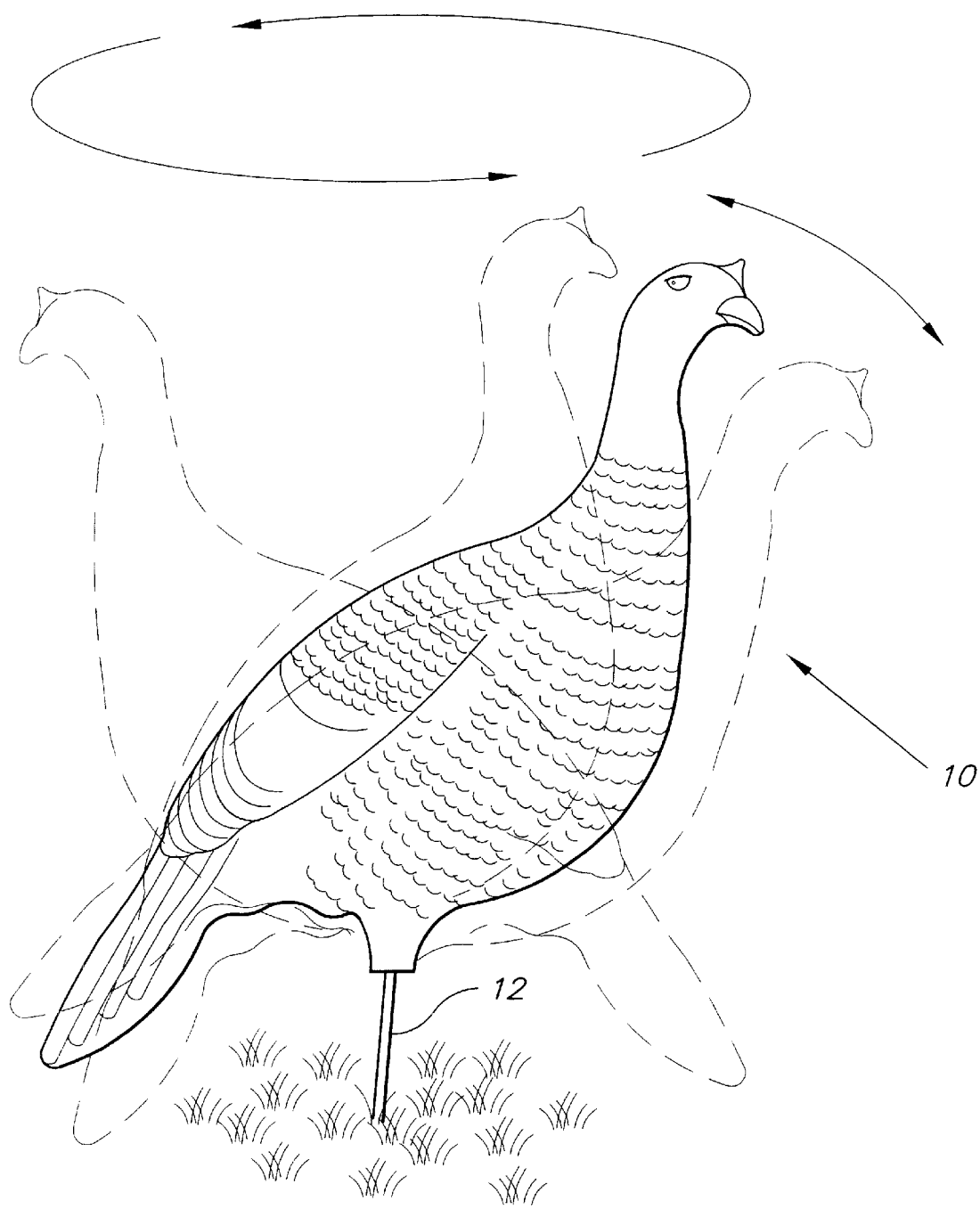
FIG. 1 is an environmental, perspective view of a first embodiment of an inflatable decoy according to the present invention.

As illustrated in FIG. 1, in its first embodiment, the decoy is generally indicated at 10 and is simulative of prey in its natural habitat. Although depicted as a turkey, it is evident that the decoy could take on the form of any game animal. Decoy 10 is loosely mounted on a stake 12. As so mounted, the decoy will respond to wind currents to move in various directions as indicated by the arrows and phantom lines.

Figure 3:
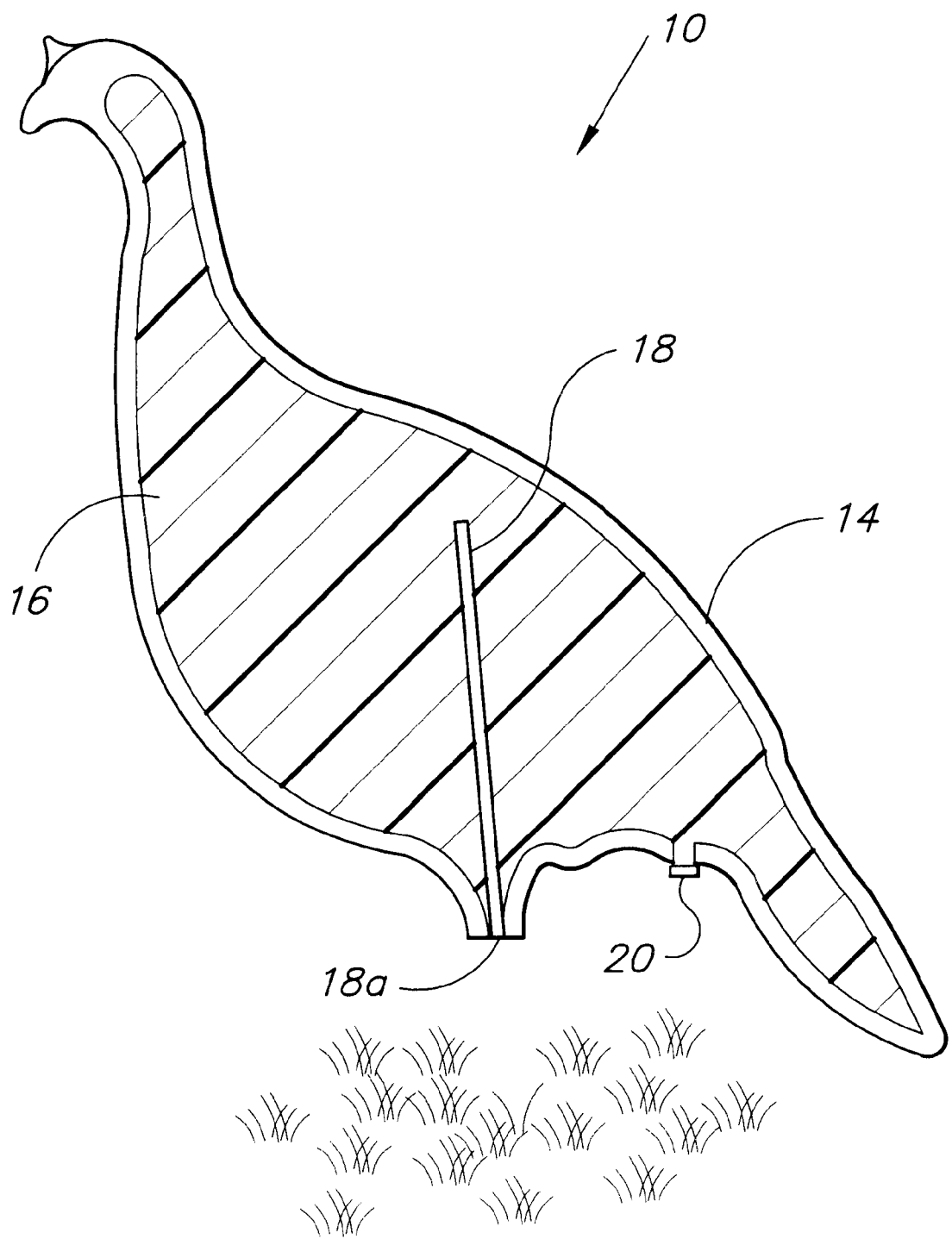
FIG. 3 is a sectional view of the decoy of FIG. 1 according to the present invention.

Attention is now directed to FIG. 3 which illustrates a cross-sectional view of decoy 10. The decoy is formed with a covering 14. Covering 14 is fabricated from a thin, durable, air impermeable material such as PVC or the like. The outer surface of the covering is imprinted with an actual photograph of the intended prey, i.e. turkey, and the covering is cut to the dimensions of the photograph. A light-weight, open-cell foam material 16 such as polyurethane is utilized to partially fill the covering and form an inner core therein. A tube 18 is embedded in the foam and has an open end 18a adapted to loosely receive stake 12. The covering is heat sealed to enclose the foam and to form an air-tight structure. A covered valve 20 is disposed on the decoy for purposes set out below.

Figure 2:
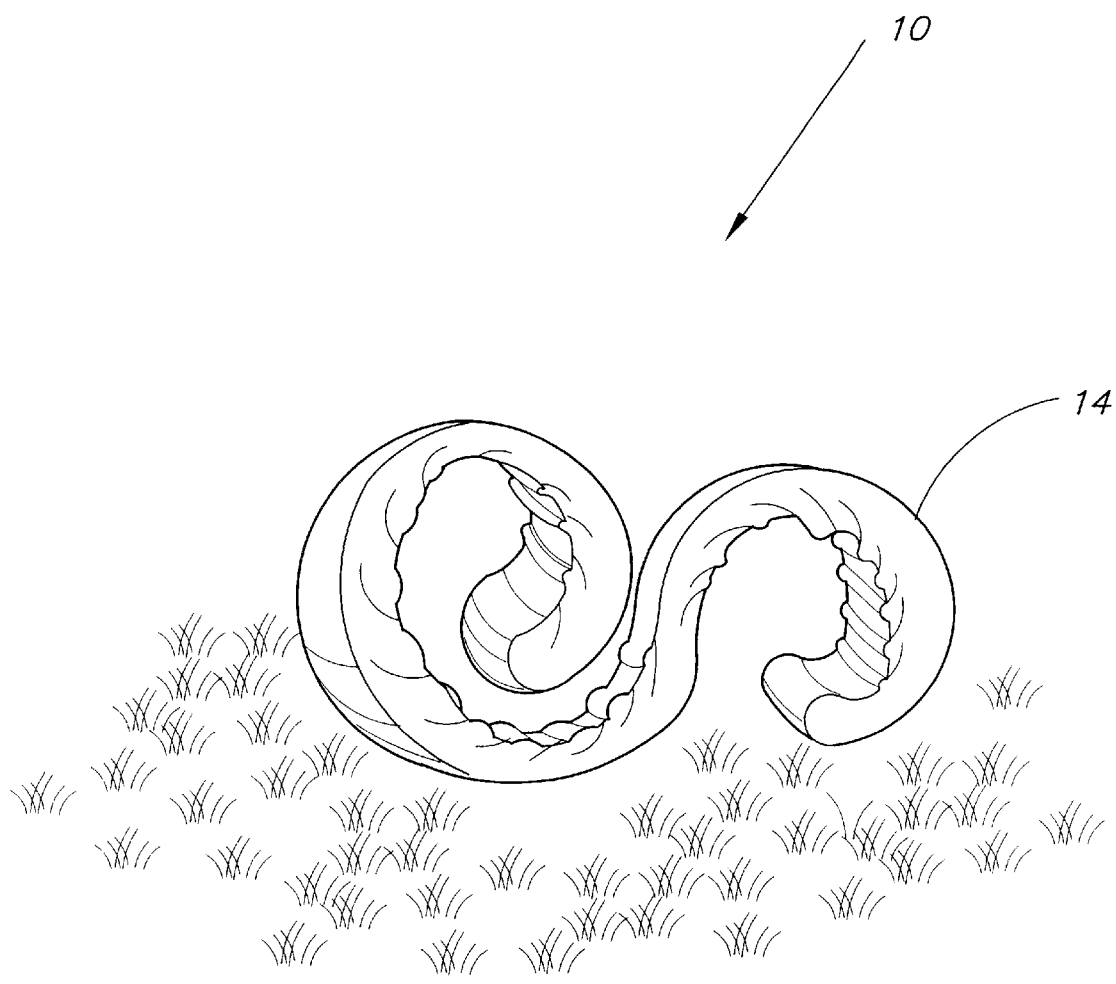
FIG. 2 is an environmental, perspective view of the decoy of FIG. 1 in a semi-collapsed condition according to the present invention.

It is known in the art that certain open-cell foam materials, i.e. polyurethane, do not require a source of compressed air to assume an inflated configuration. Merely exposing these materials to ambient air will suffice. Conversely, it requires only compression or vacuuming to return the materials to a deflated condition. Consequently, the present invention can be easily carried and stored in a deflated rolled-up state. FIG. 2 shows the decoy in a deflated, partially rolled state. To inflate the decoy, it is only necessary to open valve 20. Ambient air will function to cause the foam to expand and fill cover 14. The three-dimensional effect may be further enhanced, if necessary, by orally blowing air through valve 20. The decoy is then positioned on stake 12 to perform its intended function. The decoy is deflated by compressing and squeezing air out through the open valve and then closing the valve to prevent air re-entry.

Figure 4:
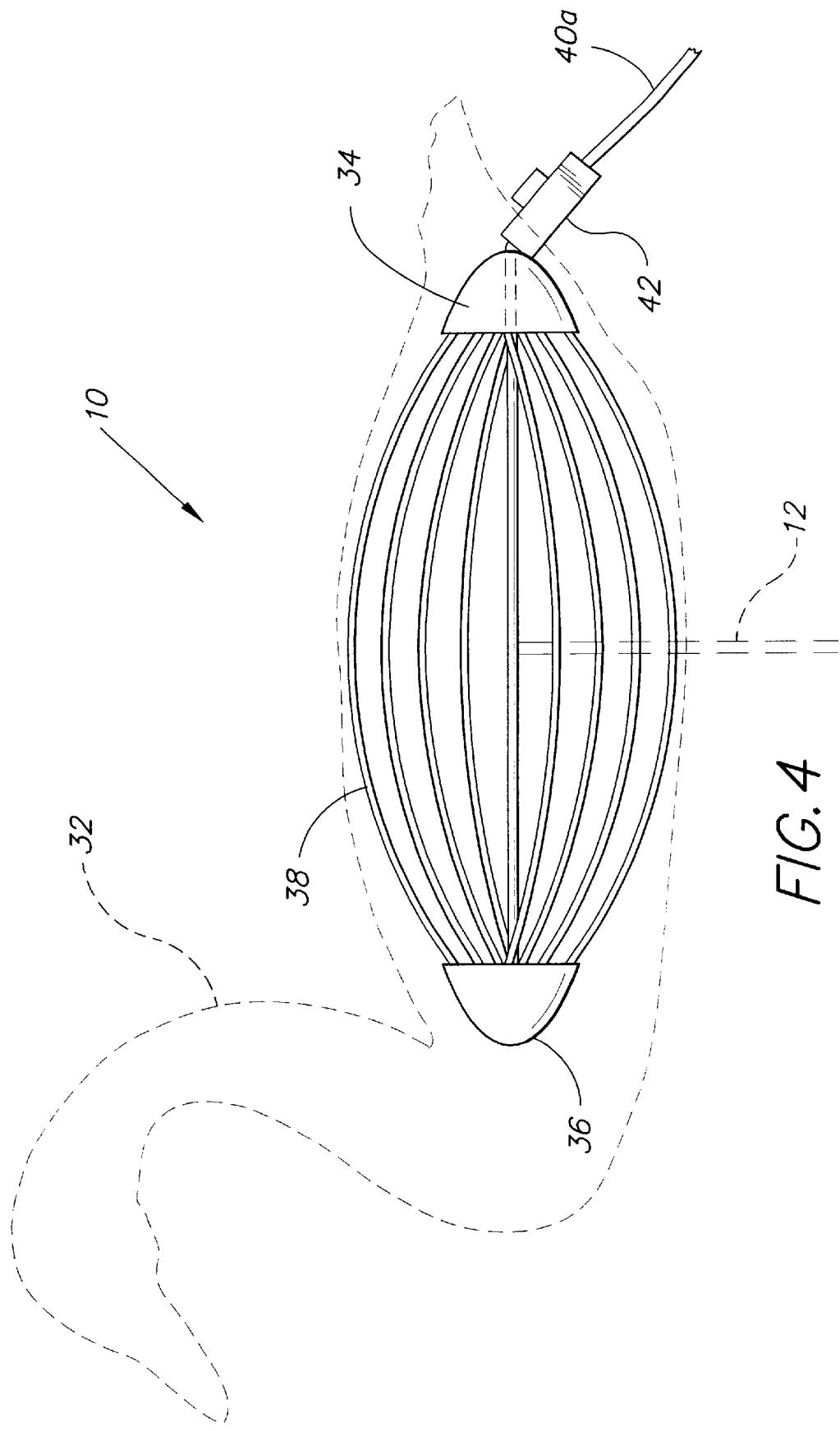
FIG. 4 is an environmental, perspective view of a second embodiment of an inflatable decoy according to the present invention.
Figure 5:
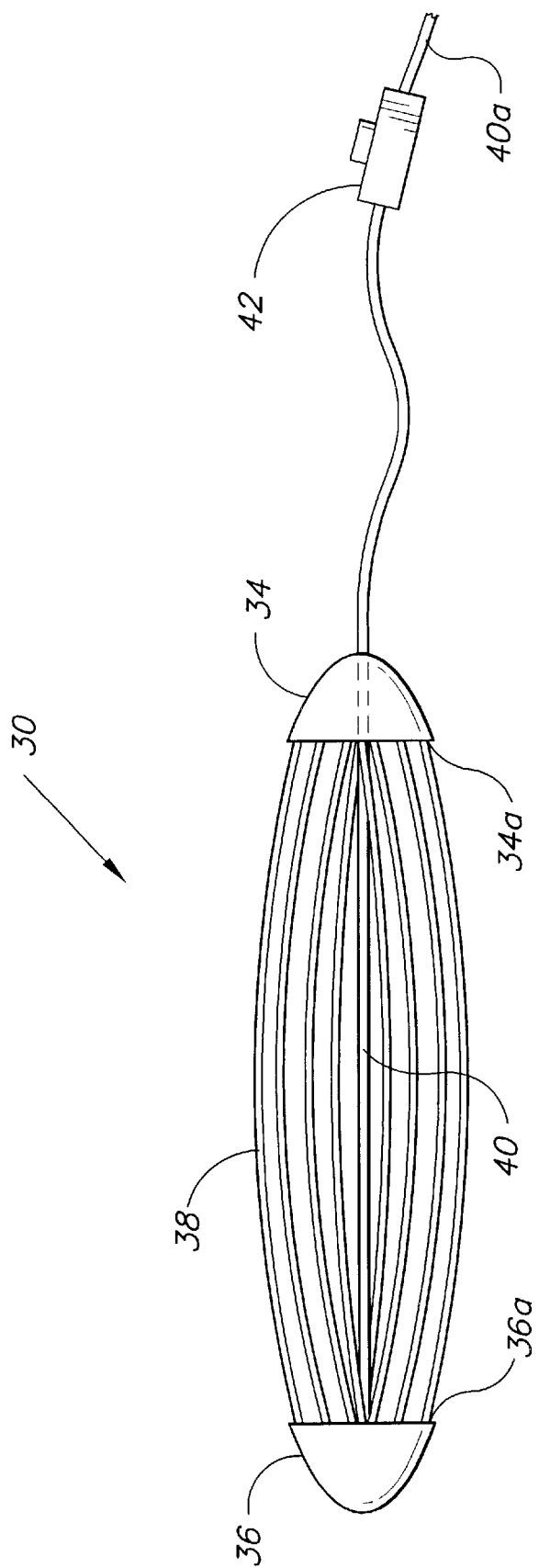
FIG. 5 is a perspective view of the inflating mechanism of FIG. 4 in a collapsed condition.

In the embodiment as represented in FIGS. 4 and 5, the decoy 10 comprises a cover 32 (shown in phantom lines) fabricated from a suitable thin, durable material (plastic or the like). Unlike the prior embodiment, cover 32 is not required to be air-tight. An expandable and collapsible device 30 is positioned inside cover 32. Device 30 comprises identical, spaced end members 34, 36 having opposed planar surfaces 34a, 36a. Members 34, 36 may be fabricated from any suitable light-weight material (cork, wood, aluminum, etc.). Although a conical configuration is preferred, members 34, 36 may take on other shapes if desired. Spanning the distance between the end members are an array of elongated ribs 38. Ribs 38 are attached at their respective ends (by any suitable means) to planar surfaces 34a, 36a. The ribs are asymmetrically attached (different radii) at the surfaces for reasons as explained below. Ribs 38 are fabricated from thin strips of spring metal or plastic. A single cord 40 is attached at the center of end member 36. Cord 40 extends through a central hole formed in end member 34 and terminates in an end 40a. A conventional, adjustable pinch clasp or clamp 42 is movably positioned on cord 40.

In use, member 30 is disposed in an expanded state when cord 40 is manipulated to pull member 36 toward member 34. This action will cause ribs 38 to bow outwardly, thereby bearing against the inner surfaces of cover 32 and causing the simulated game to "fill out". It has been determined that the rib's asymmetry will give a more natural shape to the simulated game. Moving and securing the clasp 42 at a position adjacent member 34 will allow member 30 to retain its expanded state. The decoy is then positioned on stake 12 to attract game. Loosening clasp 42 will allow ribs 38 to revert to an elongated, collapsed state best seen in FIG. 5.

Figure 6:
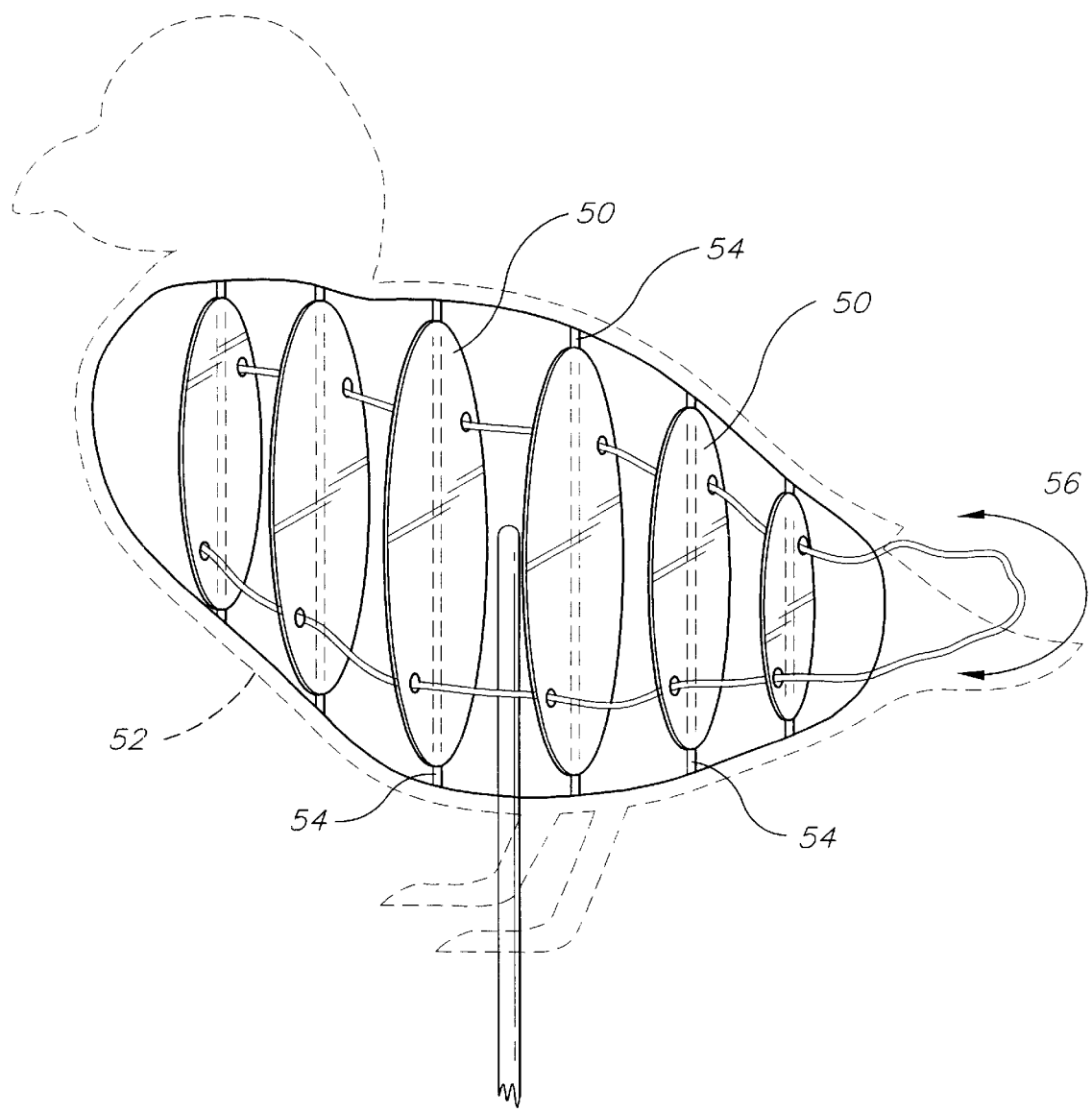
FIG. 6 is a perspective view of a third embodiment of an inflatable decoy according to the present invention.

The embodiment of FIG. 6 employs movable shutters 50 to cause the game body 52 to fill out. Shutters 50 are generally of elliptical configuration and are fashioned, in size, to correspond to the configuration of the body of the particular game animal. The shutters are mounted at the top and bottom on pivot axles 54. A control cord 56 is attached to the shutters in a manner that will allow the shutters to be opened to fill out the game body or close to cause the body to collapse. Shutters 50 may be fabricated form metal or plastic material.

It is to be understood that the present invention is not limited to the embodiments described above, but encompasses any and all embodiments within the scope of the following claims.

I claim:
1. An inflatable decoy comprising:
    an outer cover fabricated from a thin, flexible material, said outer cover having an exterior surface imprinted with an actual photograph of a game animal;
    a cavity defined by said outer cover;
    a manually operated expansion device positioned in said cavity for causing said outer cover to attain an expanded state, said manually operated expansion device comprising a first end member and a second end member;
    at least one planar surface formed on each of said first end member and second end member, each said at least one planar surface being spaced from the other in face-to-face relationship;
    an array of flexible strips spanning the space between each planar surface and asymmetrically attached on a respective one of each said planar surface;
    means for moving said first end member toward said second end member; and
    a stake having a first end positioned loosely on an aperture disposed in the decoy and a second end adapted to be inserted in a supporting surface.
2. The inflatable decoy as recited in claim 1, wherein said first end member has a central area defined on the at least one planar surface and wherein said second end member has an opening extending centrally therethrough.
3. The inflatable decoy as recited in claim 2, wherein said means includes a flexible cord having a first end secured at said central area defined on said at least one planar surface.
4. The inflatable decoy as recited in claim 3, wherein said flexible cord has a second end which extends through said opening in said second end member.
5. The inflatable decoy as recited in claim 4, including a pinch clamp, said pinch clamp disposed on said flexible cord adjacent the second end of said flexible cord.
6. The inflatable decoy as recited in claim 5, wherein said flexible strips are fabricated from spring metal strips.
7. The inflatable decoy as recited in claim 6, wherein said flexible strips are fabricated from plastic.

* * * * *